United States Patent [19]

Puls

[11] Patent Number: 5,239,154

[45] Date of Patent: Aug. 24, 1993

[54] WELDING APPARATUS

[75] Inventor: Jürgen Puls, Laxa, Sweden

[73] Assignee: ESAB Aktiebolag, Gothenburg, Sweden

[21] Appl. No.: 847,140

[22] Filed: Mar. 6, 1992

[30] Foreign Application Priority Data

Mar. 7, 1991 [SE] Sweden ............................... 9100679

[51] Int. Cl.$^5$ .............................................. B23K 9/00
[52] U.S. Cl. ............................ 219/60.2; 219/125.11
[58] Field of Search ........................ 219/60.2, 125.11

[56] References Cited

U.S. PATENT DOCUMENTS

| | | | |
|---|---|---|---|
| 3,621,182 | 11/1971 | Peyrot | 219/60.2 |
| 3,783,230 | 1/1974 | Peyrot | 219/121 EB |
| 4,142,084 | 2/1979 | Torrani | 219/60 A |
| 4,262,187 | 4/1981 | Savor | 219/60.2 |
| 4,476,367 | 10/1984 | Kazlauskas | 219/60.2 |
| 4,942,280 | 7/1990 | Gaudin et al. | 219/60.2 |

*Primary Examiner*—Clifford C. Shaw
*Attorney, Agent, or Firm*—Nils H. Ljungman & Associates

[57] ABSTRACT

Pipe-welding apparatus with a centering device for centering the pipe-welding apparatus relative to a pipe which is to be welded to an end-plate. The centering device is provided with a tubular center part which supports two pairs of sleeves arranged axially next to one another, the one sleeve in each pair being rigidly connected to the center part and the other sleeve being slidingly displaceable along the center part. A number of balls located between the sleeves in each pair of sleeves is arranged to interact yieldingly with the mutually facing end surfaces of the pair of sleeves, the axial separation of which increases in the direction towards the periphery of the device. The displaceable sleeve is located in a spring sleeve which is mounted on the center part and encloses a spring arranged to press the displaceable sleeve towards the fixed sleeve, the spring sleeve being mounted at a fixed distance from the end surface of the fixed sleeve, which distance is smaller than the diameter of the balls.

20 Claims, 1 Drawing Sheet

WELDING APPARATUS

BACKGROUND OF THE INVENTION

1. Field of the Invention

The invention relates to a pipe-welding apparatus and more particularly to a pipe-welding apparatus with a centering device for centering the pipe-welding apparatus relative to a pipe which is to be welded to an endplate, which device is provided with a tubular center part arranged to interact with a spindle of the pipe-welding apparatus, which spindle can be introduced into the center part, with two pairs of sleeves supported by the center part and arranged axially next to one another, the one sleeve in each pair being rigidly connected to the center part and the other sleeve being slidingly displaced along the center part, and with a number of balls located between the sleeves in each pair of sleeves and arranged to interact yielding with the mutually facing end surfaces of the pair of sleeves, the axial separation of which increases in the direction toward the periphery of the device.

2. Background Information

In U.S. Pat. No. 4,142,084, a welding apparatus with a centering device is described, in which two ball races interact with conical surfaces of two sleeves arranged on a pipe, the ball races moreover being separated by a floating ring arranged between them, which can take up an inclined position in relation to the radical plane of the device. The aim of this somewhat complicated arrangement is to make possible the use of the centering device in pipes with slightly oval cross-section. The balls are held in place in the device by ball holders with circular openings, the diameter of which is slightly smaller than the diameter of the balls. When the device is introduced into a pipe, the balls are pressed against certain parts of the edges of the opening, which are thus subjected to rapid wear. The openings are deformed and gradually become so large that the balls fall out. Constructing the device is complicated and mounting the balls is laborious. In general, the pipes which are to be welded are sufficiently cylindrical and special constructional measures for adapting the centering device to slightly oval pipes is not necessary.

OBJECT OF THE INVENTION

The object of the present invention is to produce a constructionally simple centering device which has a long service life and is easy to assemble.

SUMMARY OF THE INVENTION

The centering device according to the invention achieves the object and is distinguished by the fact that the displaceable sleeve is located in a spring sleeve which is mounted on the center part and encloses a spring arranged to press the displaceable sleeve towards the fixed sleeve, the spring sleeve being mounted at a fixed distance A from the end surface of the fixed sleeve, which distance is smaller than the diameter D of the balls. When the centering device is not being used, the balls are pressed against the edge of the opening which is formed between the fixed sleeve and the spring sleeve. As soon as the centering device is introduced into a pipe, the balls bear only against the pipe and against the end surfaces of the displaceable sleeve and the fixed sleeve. The edges of the opening are not loaded at all, and in particular not during introduction of the centering device into the pipe, where, as a result of the friction against the inner wall of the pipe, the balls are also subjected to a considerable force in the axial direction, which considerable force in the axial direction, in contrast to the known arrangement, is absorbed completely by the end surfaces of the displaceable sleeve and the fixed sleeve.

According to a preferred embodiment of the invention, the two fixed sleeves are each located on an end of the center part and the spring sleeves located between the fixed sleeves are separated by an intermediate piece which is preferably an integral part of the center part. There is preferably inserted between the intermediate piece and the spring sleeve a detachable distance piece, the axial width of which is slightly greater than the difference between the diameter D of the balls and said distance A. Assembly of the centering device is thus made considerably easier. During mounting of the balls, the distance piece is removed, as a result of which the width of the opening between the fixed sleeve and the spring sleeve becomes greater than the diameter of the ball. As soon as the balls are in place, the distance piece is fitted and the balls cannot fall out of the device.

One aspect of the invention resides broadly in a pipe-welding apparatus for welding a pipe to an end plate, said apparatus comprising: a body; a support part for supporting said body on the end plate; a rotating part disposed on said body; welding means mounted on said rotating part, said welding means for producing a weldment between the pipe and the end plate; a spindle mounted on said rotating part; a centering device mounted on said spindle, said centering device for centering said apparatus relative to the pipe, said centering device comprising: a center part having a central axis, said center part being mounted on said spindle; a pair of sleeves, said pair of sleeves comprising a first sleeve and a second sleeve, said first sleeve and said second sleeve being supported by said center part; said first sleeve and said second sleeve being arranged axially next to one another along said center part; said first sleeve being rigidly connected to said center part said second sleeve being slidingly displaceable along said central axis of said center part; said first sleeve having a first end surface; said second sleeve having a second end surface; said first end surface and said second end surface being configured to face one another, the axial separation of said end surfaces increasing in a direction away from the central axis of said center part; a plurality of balls, each of said balls having a diameter; said plurality of balls being located between said first end surface and said second end surface, said plurality of balls arranged to interact yieldingly with said first end surface and said second end surface; a third sleeve being supported by said center part, said third sleeve having an end surface facing said first end surface, said third sleeve being separated from said first end surface by a distance A, said distance A being less than said diameter of said balls, and said second sleeve being surrounded by said third sleeve; and biasing means being located within said third sleeve, said biasing means pressing said second sleeve towards said first sleeve.

Another aspect of the invention resides broadly in a pipe-welding apparatus for welding a pipe to an end plate, said apparatus comprising: a body; support means for supporting said body adjacent to the end plate and the pipe; a rotating part disposed on said body; welding means mounted on said rotating part, said welding means for producing a weldment between the pipe and the end plate; a centering device mounted on said rotating part, said centering device for centering said apparatus relative to the pipe, said centering device comprising: a center part having a central axis, said center part being mounted on said rotating part; a pair of sleeves, said pair of sleeves comprising a first sleeve and a second sleeve, said first sleeve and said second sleeve being supported by said center part; said first sleeve and said second sleeve being arranged axially next to one another along said center part; said first sleeve being rigidly connected to said center part; said second sleeve being slidingly displaceable along said central axis of said center part; said first sleeve having a first end surface; said second sleeve having a second end surface; said first end surface and said second end surface being configured to face one another, the axial separation of said end surfaces increasing in a direction away from the central axis of said center part; a plurality of balls, each of said balls having a diameter; said plurality of balls being located between said first end surface and said second end surface, said plurality of balls arranged to interact yieldingly with said first end surface and said second end surface; a third sleeve being supported by said center part, said third sleeve having an end surface facing said first end surface, said third sleeve being separated from said first end surface by a distance A, said distance A being less than said diameter of said balls, and said second sleeve being surrounded by said third sleeve; and biasing means being located within said third sleeve, said biasing means pressing said second sleeve towards said first sleeve.

Yet another aspect of the invention resides broadly in a centering device for centering a pipe-welding apparatus relative to a pipe, which pipe is to be welded to an end plate, said centering device comprising: a center part having a central axis, said center part being configured to attach to the pipe-welding apparatus; a pair of sleeves, said pair of sleeves comprising a first sleeve and a second sleeve, said first sleeve and said second sleeve being supported by said center part; said first sleeve and said second sleeve being arranged axially next to one another along said center part; said first sleeve being rigidly connected to said center part; said second sleeve being slidingly displaceable along said central axis of said center part; said first sleeve having a first end surface; said second sleeve having a second end surface; said first end surface and said second end surface being configured to face one another, the axial separation of said end surfaces increasing in a direction away from the central axis of said center part; a plurality of balls, each of said balls having a diameter; said plurality of balls being located between said first end surface and said second end surface, said plurality of balls arranged to interact yieldingly with said first end surface and said second end surface; a third sleeve being supported by said center part, said third sleeve having an end surface facing said first end surface, said third sleeve being separated from said first end surface by a distance A, said distance A being less than said diameter of said balls, and said second sleeve being surrounded by said third sleeve; and biasing means being located within said third sleeve, said biasing means pressing said second sleeve towards said first sleeve.

The invention will be made clear by the following description together with the attached drawing of an exemplary embodiment of the same.

DESCRIPTION OF THE PREFERRED EMBODIMENTS

Figure 1:
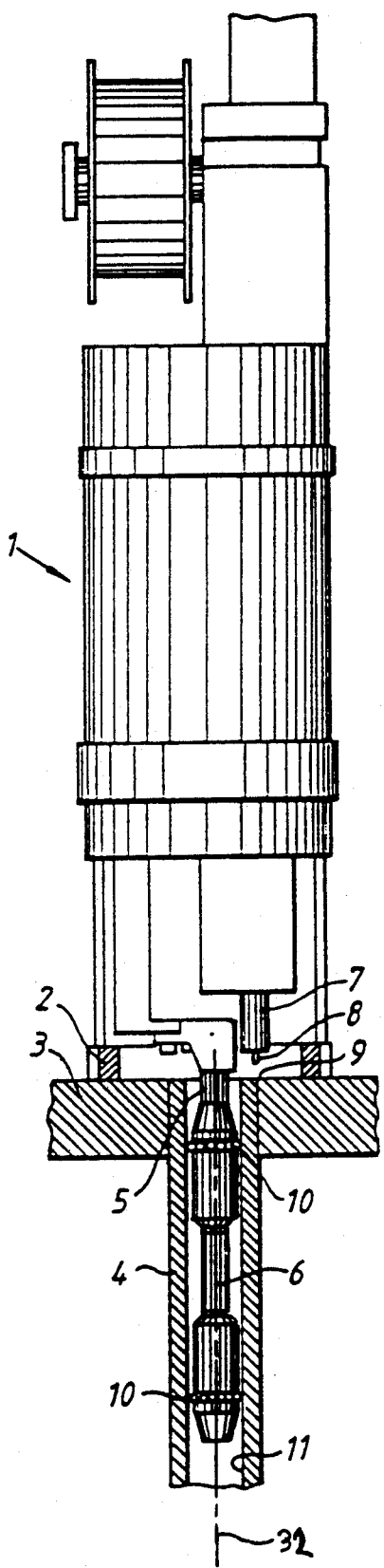
FIG. 1 shows somewhat diagrammatically a pipe-welding apparatus together with a centering device.

FIG. 1 shows a pipe-welding apparatus 1 is supported with a support ring 2 against an end-plate 3, into which a pipe 4 is inserted which is to be welded to the end-plate 3. Pipe-welding apparatuses of this type are well known and are not described in greater detail here. There is fastened to the rotating part of the pipe-welding apparatus 1 a spindle 5 which supports a centering device 6 which will be described below. Also mounted on the rotating part is a welding blowpipe, of which the gas nozzle 7 of the blowpipe and an electrode 8 are shown. This blowpipe is directed towards the joint 9 between the pipe 4 and the end-plate 3. During welding, the rotatable part rotates and the electrode 8 follows the circular welding joint 9. The spindle 5 follows the movement and draws with it the centering device 6 which is rotatably clamped in the pipe 4 with the aid of spring-operated balls 10 which are pressed against the inner wall 11 of the pipe 4. Centering device 6 has a central axis or longitudinal axis 32.

Figure 3:
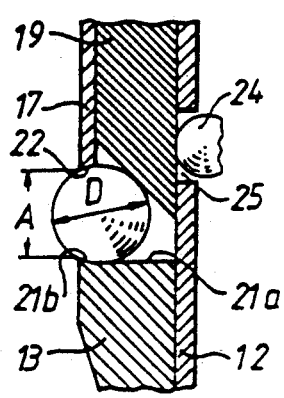
FIG. 3 shows a detail of FIG. 2 on a larger scale.
Figure 2:
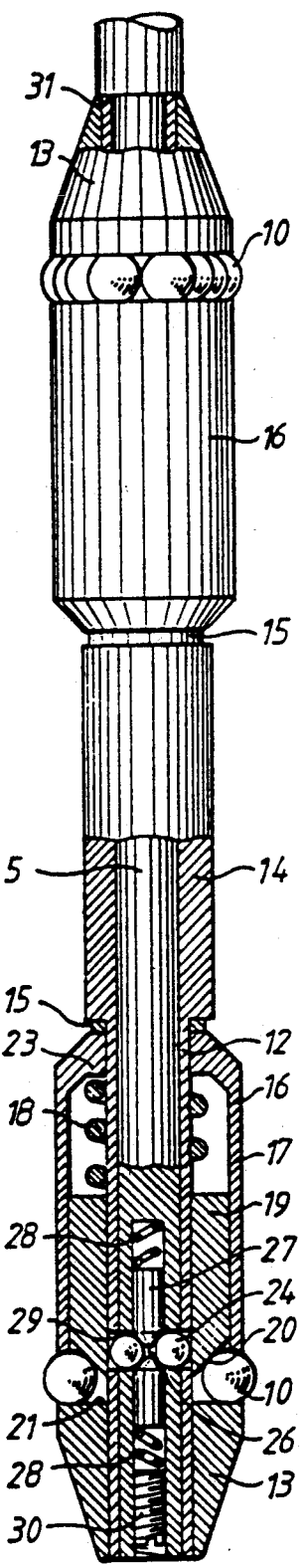
FIG. 2 shows the centering device partially in section.

The centering device 6 is symmetrically constructed. It can be introduced into the pipe 4 with one end or the other. In FIG. 2 only the lower half of the centering device 6 is shown in section. The other, upper half of the device 6 is identical to the lower half. The same reference numbers are used in this case for like parts of both halves. The centering device 6 is shown here in an inactive state but interacting with the spindle 5. Fitted on the ends of a center pipe 12 are sleeves 13 which are rigidly connected to the center pipe 12. A middle part 14 of the center pipe 12 is slightly thicker than the rest of the center pipe 12. The middle part 14 constitutes a stop for distance rings 15 and spring sleeves 16. The casing 17 of the spring sleeve extends towards the fixed sleeve 13. Inserted into the spring sleeve 16 is a pressure spring 18 which exerts its spring force on a sleeve 19 with a conical end surface 20, which is located displaceably on the center pipe 12 and in the spring sleeve 16. The spring 18 tends to guide and push the sleeve 19 towards the fixed sleeve 13. The end surface 20 of the sleeve 19 facing towards the fixed sleeve 13 is conical. FIG. 3 shows that the annular end surface 21 of the fixed sleeve 13 is plane on its inner part 21a and, towards the periphery, becomes a concave surface 21b. The radius of curvature of the concave surface 21b is preferably the same size as the diameter D of the ball 10. The balls 10 all have the same diameter and bear against the two end surfaces 20, 21. The spring force is divided up, because of the conical end surface 20, into an axial and a radial component. The radical force component tends to move the balls 10 outwards in the radical direction. When the centering device 6, as shown here, has not been introduced into a pipe, this movement is stopped by the annular opening which is delimited by the fixed sleeve 13 and the edge 22 of the spring sleeve 16. If the centering device 6 is introduced into a pipe, the inner diameter of which is slightly smaller than the outer diameter of the device, which outer diameter is defined by the balls 10, the balls 10 are pressed radially inwards, in which connection they remain in contact with the two end surfaces 20, 21 and moreover with the inner wall of the pipe. The axial component of the radially inwardly directed force is transmitted to the displaceable sleeve 19 and the spring 18 is compressed. Those edges of the device against which the balls were supported in the inactive state of the device 6, concave surface 21b of fixed sleeve 13 and edge 22 of spring sleeve 16, are relieved completely of the spring force and are therefore not worn out when the device 6 is inserted into a pipe. The distance between the edge 22 of the spring sleeve 16 and the fixed sleeve 13 is indicated by A (FIG. 3) and is smaller than the diameter D of the balls 10. The balls 10, therefore, cannot fall out of the device 6.

During assembly of the device, the spring sleeve 16 together with the spring 18 and the displaceable sleeve 19 are first pushed into the center pipe 12 and the spring sleeve 16 is brought into contact with the middle part 14. At the same time, the spring is kept compressed so that the sleeve 19 is introduced completely into the spring sleeve 16. Subsequently, the sleeve 13 is fastened on the center pipe 12, for example by shrinking on. The distance between the fixed sleeve 13 and the edge 22 of the spring sleeve is no greater than the diameter of the balls 10 and the balls can easily be placed in the annular opening, the device expediently being held vertically. Subsequently, the spring sleeve 16 with the spring 18 and the sleeve 19 is moved toward the fixed sleeve 13 and there is introduced between the bottom 23 of the spring sleeve 16 and the middle part 14 the distance ring 15, for example a locking washer of such a width that the edge 22 of the spring sleeve 16 is situated at a distance A from the fixed sleeve 13. The holding-together grip between the sleeve 19 and the spring 18 expands and presses the sleeve 19 against the balls 10. That is, the compression of spring 18 is released, which allows spring 18 to expand and press sleeve 19 against the balls 10. Assembly is thus completed on the one end of the centering device and is repeated on the other end.

As shown in FIGS. 2 and 3, the spindle 5 introduced into the centering device is provided with spring-loaded balls 24 which are in engagement with opening 25 in the center pipe 12, as a result of which the centering device 6 is locked against the spindle 5 in the axial direction. The balls 24 are positioned in a diametral hole 26, which diametral hole 26 passes through the sides of spindle 5. The balls 24 are held in place by two conical pins 27 which are each pressed by a pressure spring 28 against the balls 24. The balls 24 ar thus pressed against openings 29 of diametral hole 26 in the spindle 5, the diameter of openings 29 is smaller than the diameter of balls 24. The pins 27 and the springs 28 are enclosed in the spindle by means of screw 30. The spindle is provided with a stop 31 which defines the position of the centering device in the pipe relative to the pipe-welding apparatus.

Each centering device is dimensioned for pipes within a certain diameter range. In general, a number of centering devices is therefore necessary for adapting the pipe-welding apparatus to different pipe diameters. It may, moreover, also be suitable to use spindles with different diameters, depending upon the diameter of the centering device.

In summary, one feature of the invention resides broadly in the centering device for centering a pipe-welding apparatus relative to a pipe which is to be welded to an end-plate, which device is provided with a tubular center part 12 arranged to interact with a spindle 5 of the pipe-welding apparatus, which spindle can be introduced into the center part, with two pairs of sleeves 13, 19 supported by the center part and arranged axially next to one another, the one sleeve 13 in each pair being rigidly connected to the center part and the other sleeve 19 being slidingly displaceable along the center part 12, with a number of balls 10 located between the sleeves in each pair of sleeves and arranged to interact yieldingly with the mutually facing end surfaces 20, 21 of the pair of sleeves, the axial separation of which increases in the direction toward the periphery of the device, characterized in that the displaceable sleeve 19 is located in a spring sleeve 16 which is mounted on the center part and encloses a spring 18 arranged to press the displaceable sleeve 19 towards the fixed sleeve 13, the spring sleeve 16 being mounted at a fixed distance A from the end surface 21 of the fixed sleeve 13, which distance is smaller than the diameter D of the balls.

Another feature of the invention resides broadly in the centering device, characterized in that the two fixed sleeves 13 are each located on an end of the center part 12 and the spring sleeves 16 located between the fixed sleeves are separated by an intermediate piece 14 which is preferably an integral part of the center part.

Yet another feature of the invention resides broadly in the centering device, characterized in that there is inserted between the intermediate piece 14 and the spring sleeve 16 a detachable distance piece 15, the axial width of which is slightly greater than the difference between the diameter D of the balls 10 and said distance A.

A further feature of the invention resides broadly in the centering device, characterized in that the end surface of the fixed sleeve 13 is essentially a plane surface 21a which is perpendicular to the axis of the device and which, in the vicinity of the periphery of the device, becomes a concave surface 21b, and the end surface 20 of the displaceable sleeve 19 is conical.

An example of pipe-welding apparatus can be found in U.S. Pat. No. 3,987,274 entitled "Portable Welding Machine for Welding Terminals of Tubes."

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Pipe-welding apparatus for welding a pipe to an end plate, said apparatus comprising:

a body;

a support part for supporting said body on the end plate;

a rotating part disposed on said body;

welding means mounted on said rotating part, said welding means for producing a weldment between the pipe and the end plate;

a spindle mounted on said rotating part;

a centering device mounted on said spindle, said centering device for centering said apparatus relative to the pipe, said centering device comprising:

a center part having a central axis, said center part being mounted on said spindle;

a pair of sleeves, said pair of sleeves comprising a first sleeve and a second sleeve, said first sleeve and said second sleeve being supported by said center part;

said first sleeve and said second sleeve being arranged axially next to one another along said center part;

said first sleeve being rigidly connected to said center part;

said second sleeve being slidingly displaceable along said central axis of said center part;

said first sleeve having a first end surface;

said second sleeve having a second end surface;

said first end surface and said second end surface being configured to face one another, the axial separation of said end surfaces increasing in a direction away from the central axis of said center part;

a plurality of balls, each of said balls having a diameter;

said plurality of balls being located and held between said first end surface and said second end surface, said plurality of balls arranged to interact yieldingly with said first end surface and said second end surface;

a third sleeve being supported by said center part, said third sleeve having a third end surface facing said first end surface, said third end surface being disposed to hold said balls against said first end surface and said second end surface, said third end surface being an extremity of said third sleeve, said third end surface being stationary with respect to and separated from said first end surface by a fixed distance A, said distance A being less than said diameter of said balls, and said second sleeve being surrounded by said third sleeve; and biasing means being located within said third sleeve, said biasing means pressing said second sleeve towards said first sleeve.

2. The pipe-welding apparatus of claim 1, wherein said pair of sleeves comprises two pairs of sleeves, said two pairs of sleeves comprising two first sleeves and two second sleeves.

3. The pipe-welding apparatus of claim 2, wherein:

said center part has a first end and a second end, said first end is opposite said second end;

one of said two first sleeves is rigidly connected to said first end of said center part and the other of said two first sleeves is rigidly connected to said second end of said center part;

said third sleeve comprises two third sleeves, said two third sleeves are located between said two first sleeves; and said center part comprises an intermediate piece, said intermediate piece separates said two third sleeves from one another along said center part.

4. The pipe-welding apparatus of claim 3, wherein a detachable distance piece is inserted between each of said two third sleeves and said intermediate piece, said detachable distance piece having an axial width slightly greater than the difference between said diameter of said balls and said distance A.

5. The pipe-welding apparatus of claim 4, wherein said second end surface of said second sleeve is conical.

6. The pipe-welding apparatus of claim 5, wherein said first end surface of said first sleeve is essentially planar and said first end surface is essentially perpendicular to said central axis of said center part, and said first end surface is concave in a peripheral area away from said central axis of said center part.

7. The pipe-welding apparatus of claim 6, wherein:

said welding means comprises an electrode and a gas nozzle; and said biasing means comprises a spring.

8. Pipe-welding apparatus for welding a pipe to an end plate, said apparatus comprising:

a body;

support means for supporting said body adjacent to the end plate and the pipe;

a rotating part disposed on said body;

welding means mounted on said rotating part, said welding means for producing a weldment between the pipe and the end plate;

a centering device mounted on said rotating part, said centering device for centering said apparatus relative to the pipe, said centering device comprising:

a center part having a central axis, said center part being mounted on said rotating part;

a pair of sleeves, said pair of sleeves comprising a first sleeve and a second sleeve, said first sleeve and said second sleeve being supported by said center part;

said first sleeve and said second sleeve being arranged axially next to one another along said center part;

said first sleeve being rigidly connected to said center part;

said second sleeve being slidingly displaceable along said central axis of said center part;

said first sleeve having a first end surface;

said second sleeve having a second end surface;

said first end surface and said second end surface being configured to face one another, the axial separation of said end surfaces increasing in a direction away from the central axis of said center part;

a plurality of balls, each of said balls having a diameter;

said plurality of balls being located and held between said first end surface and said second end surface, said plurality of balls arranged to interact yieldingly with said first end surface and said second end surface;

a third sleeve being supported by said center part, said third sleeve having a third end surface facing said first end surface, said third end surface being disposed to hold said balls against said first end surface and said second end surface, said third end surface being an extremity of said third sleeve, said third end surface being separated from said first end surface by a distance A, said distance A being less than said diameter of said balls, all portions of said third sleeve other than said third end surface being disposed at a distance from said first end surface greater than said distance A, and said second sleeve being surrounded by said third sleeve; and biasing means being located within said third sleeve, said biasing means pressing said second sleeve towards said first sleeve.

9. The pipe-welding apparatus of claim 8, wherein said pair of sleeves comprises two pairs of sleeves, said two pairs of sleeves comprising two first sleeves and two second sleeves.

10. The pipe-welding apparatus of claim 9, wherein:
said center part has a first end and a second end, said first end is opposite said second end;
one of said two first sleeves is rigidly connected to said first end of said center part and the other of said two first sleeves is rigidly connected to said second end of said center part;
said third sleeve comprises two third sleeves, said two third sleeves are located between said two first sleeves; and
said center part comprises an intermediate piece, said intermediate piece separates said two third sleeves from one another along said center part.

11. The pipe-welding apparatus of claim 10, wherein a detachable distance piece is inserted between each of said two third sleeves and said intermediate piece, said detachable distance piece having an axial width slightly greater than the difference between said diameter of said balls and said distance A.

12. The pipe-welding apparatus of claim 11, wherein:
said second end surface of said second sleeve is conical; and
said biasing means comprises a spring.

13. The pipe-welding apparatus of claim 12, wherein said first end surface o said first sleeve is essentially planar and said first end surface is essentially perpendicular to said central axis of said center part, and said first end surface is concave in a peripheral area away from said central axis of said center part.

14. Centering device for centering a pipe-welding apparatus relative to a pipe, which pipe is to be welded to an end plate, said centering device comprising:
a center part having a central axis, said center part being configured to attach to the pipe-welding apparatus;
a pair of sleeves, said pair of sleeves comprising a first sleeve and a second sleeve, said first sleeve and said second sleeve being supported by said center part;
said first sleeve and said second sleeve being arranged axially next to one another along said center part;
said first sleeve being rigidly connected to said center part;
said second sleeve being slidingly displaceable along said central axis of said center part;
said first sleeve having a first end surface;
said second sleeve having a second end surface;
said first end surface and said second end surface being configured to face one another, the axial separation of said end surfaces increasing in a direction away from the central axis of said center part;
a plurality of balls, each of said balls having a diameter;
said plurality of balls being located and held between said first end surface and said second end surface, said plurality of balls arranged to interact yieldingly with said first end surface and said second end surface;
a third sleeve being supported by said center part, third sleeve having a third end surface facing said first end surface, said third end surface being disposed to hold said balls against said first end surface and said second end surface, said third end surface being an extremity of said third sleeve, said third end surface being separated from said first end surface by a distance A, said distance A being less than said diameter of said balls, all portions of said third sleeve other than said third end surface being disposed at a distance from said first end surface greater than said distance A, and said second sleeve being surrounded by said third sleeve; and
biasing means being located within said third sleeve, said biasing means pressing said second sleeve towards said first sleeve.

15. The centering device of claim 14, wherein said pair of sleeves comprises two pairs of sleeves, said two pairs of sleeves comprising two first sleeves and two second sleeves.

16. The centering device of claim 15, wherein:
said center part has a first end and a second end, said first end is opposite said second end;
one of said two first sleeves is rigidly connected to said first end of said center part and the other of said two first sleeves is rigidly connected to said second end of said center part;
said third sleeve comprises two third sleeves, said two third sleeves are located between said two first sleeves; and
said center part comprises an intermediate piece, said intermediate piece separates said two third sleeves from one another along said center part.

17. The centering device of claim 16, wherein a detachable distance piece is inserted between each of said two third sleeves and said intermediate piece, said detachable distance piece having an axial width slightly greater than the difference between said diameter of said balls and said distance A.

18. The centering device of claim 17, wherein said second end surface of said second sleeve is conical.

19. The centering device of claim 18, wherein said first end surface of said first sleeve is essentially planar and said first end surface is essentially perpendicular to said central axis of said center part, and said first end surface is concave in a peripheral area away from said central axis of said center part.

20. The centering device of claim 19, wherein:
said center part is tubular and said center part is configured to attach to a spindle of the pipe-welding apparatus; and
said biasing means comprises a spring.

* * * * *

UNITED STATES PATENT AND TRADEMARK OFFICE
CERTIFICATE OF CORRECTION

PATENT NO. : 5,239,154

DATED : August 24, 1993

INVENTOR(S) : Jürgen PULS

It is certified that error appears in the above-identified patent and that said Letters Patent is hereby corrected as shown below:

In column 9, line 39, Claim 13, after 'surface', delete "o" and insert --of--.

Signed and Sealed this

Nineteenth Day of April, 1994

Attest:

BRUCE LEHMAN

*Attesting Officer*         *Commissioner of Patents and Trademarks*